United States Patent
Yabe

[19]

[11] Patent Number: 6,023,344
[45] Date of Patent: *Feb. 8, 2000

[54] IMAGE PROCESSING APPARATUS AND METHOD

[75] Inventor: Takashi Yabe, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/684,081

[22] Filed: Jul. 19, 1996

[30] Foreign Application Priority Data

Jul. 20, 1995 [JP] Japan .................................. 7-184201

[51] Int. Cl.[7] .............................. G03F 3/08; H04N 1/21
[52] U.S. Cl. ...................... 358/296; 358/521; 358/523; 395/114
[58] Field of Search ......................... 395/114; 358/296, 358/401, 500, 501, 448, 518, 523, 524, 530, 521

[56] References Cited

U.S. PATENT DOCUMENTS

| | | | |
|---|---|---|---|
| 5,351,137 | 9/1994 | Kato et al. .............................. | 358/457 |
| 5,416,613 | 5/1995 | Rolleston et al. ...................... | 358/518 |
| 5,438,648 | 8/1995 | Takaoka et al. ........................ | 395/114 |
| 5,543,936 | 8/1996 | Ulichney ................................. | 358/456 |
| 5,594,557 | 1/1997 | Rolleston et al. ...................... | 358/518 |
| 5,594,558 | 1/1997 | Usami et al. ........................... | 358/518 |
| 5,673,075 | 9/1997 | Jacobs et al. .......................... | 358/298 |
| 5,694,224 | 12/1997 | Tai ......................................... | 358/455 |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

A color value operation unit generates the sum of C, M, Y and K signal levels inputted from an external device by pixel. A control value operation unit compares the total Color_In of the levels of each of the color components generated by the color value operation unit and the maximum input level Color_Lim indicating the capability of a printer, then generates a limitation value Lim which is used for converting the input image signal levels to levels within the capability of the printer. A control processing unit reduces the input signal levels by using the limitation value Lim output from the control value operation unit, then outputs the image signals whose levels are reduced to the printer. Therefore, even in a case where C, M, Y and K image signals generated in an external device are input to a printer of a color copying machine, the levels of the input image signals are controlled in accordance with the capability of the printer, thus it is possible to output an image of high quality.

24 Claims, 18 Drawing Sheets

FIG. 12

| |
|---|
| DIRECTORY INFORMATION |
| ⋮ |
| INPUT MODULE |
| OUTPUT MODULE |
| ⋮ |
| MAXIMUM SIGNAL VALUE DETERMINATION MODULE |
| SUMMATION MODULE |
| SIGNAL LEVEL CONTROL MODULE |
| ⋮ |
| CONVERSION TABLE SELECTION MODULE |
| CONVERSION TABLE SET MODULE |
| ⋮ |
| TOTAL/PROCESSING CAPABILITY COMPARISON MODULE |
| UCR VALUE OPERATION MODULE |
| ⋮ |
| ⋮ |
| COLOR CORRECTION PARAMETER GENERATION MODULE |
| COLOR CORRECTION MODULE |
| ⋮ |
| ⋮ |
| WARNING SIGNAL GENERATION MODULE |
| DESTINATION DEVICE SELECTION MODULE |
| ⋮ |
| ⋮ |

IMAGE PROCESSING APPARATUS AND METHOD

BACKGROUND OF THE INVENTION

The present invention relates to an image processing apparatus and method, more particularly, to an image processing apparatus and method which control levels of input image signals so as to be suitable for a destination device to which the image signals are transmitted.

An image forming apparatus, such as a color copying machine, can be used as an apparatus for visualizing and outputting a color image generated by an external device, such as a computer.

FIG. 1 is a block diagram illustrating a configuration of a color copying machine 100. In a normal copying operation, a reader 101 reads an original image, an image processing unit 107 processes image signals of the original image, then obtained C, M, Y and K image signals are outputted to a printer 105 where an image is formed. In addition, C, M, Y and K image signals generated by an external device 106 are directly inputted to the printer 105 of the color copying machine 100, and an image is formed. The latter image forming method requires a relatively simple configuration, however, there are the following undesirable problems.

In a case where the printer 105 uses a color electrophotographic method using toners, there is a limitation in the total amount of toners which forms one dot on a recording paper sheet, or in the sum of the C, M, Y and K signal values, depending upon the capability of a printer. For example, when an eight-bit signal value representing each of C, M, Y and K signals is used, the quality of the output image is guaranteed up to the sum of the C, M, Y and K signal values less than 690, however, if the sum exceeds 690, the quality of the image is beyond guarantee. In a case where the C, M, Y and K signals inputted from the external device 106 are directly sent to the printer 105, and each of C, M, Y and K signals has the maximum value (255), the sum of the signal values becomes 1020 which far exceeds 690. Thus, when the C, M, Y and K signals whose total value exceeds the capability of the printer 105 are inputted, a deteriorated image is outputted because of dispersion of toners caused by transfer error and fixing error.

Note, in the following explanation, the sum of the C, M, Y and K signal values which indicates the maximum amount of toners that can form one dot on a recording paper sheet depending upon the capability of a printer may be called the "maximum input level" of a printer.

Further, when input image signal levels are controlled based on a destination device, a color image may be outputted in colors which a user does not desire as the controlled result.

SUMMARY OF THE INVENTION

The present invention has been made in consideration of the above situation, and has as its object to provide an image processing apparatus and method which control levels of input image signals so as to be suitable to a destination device to which the image signals are transmitted.

According to the present invention, the foregoing object is attained by providing an image processing apparatus for controlling levels of input image signals depending upon a destination device to which the image signals are outputted, the apparatus comprising: generation means for generating the sum of input image signal levels of each of color components; and control means for controlling the levels of the input image signals in accordance with the sum generated by the generation means and capability of the destination device.

Further, the foregoing object is also attained by providing an image processing apparatus for controlling levels of input image signals depending upon a destination device to which the image signals are outputted, the apparatus comprising: generation means for generating the sum of input image signal levels of each of color components; selection means for selecting a conversion table for controlling the input image signal levels in accordance with the sum generated by the generation means and capability of the destination device; and set means for setting the conversion table selected by the selection means in a signal level correction means provided in the destination device.

Furthermore, the foregoing object is also attained by providing an image processing apparatus for controlling levels of input image signals depending upon a destination device to which the image signals are outputted, the apparatus comprising: first generation means for generating the sum of input image signal levels of each of color components; comparison means for comparing the sum generated by the first generation means and capability of the destination device; second generation means for generating an under color removal value from the image signal levels of the each of color components in accordance with the comparison result obtained by the comparison means; and control means for controlling the input image signal levels on the basis of the under color removal value generated by the second generation means.

It is another object of the present invention to provide an image processing apparatus and method which perform color correction on density data of a plurality of color components and transmit the color-corrected image data to an image forming apparatus that forms a multi-value image.

According to the present invention, the foregoing object is attained by providing an image processing apparatus which performs color correction on density data consisting of a plurality of color components and transmits the image data performed with the color correction to an image forming apparatus forming a multi-value image, the apparatus comprising: input means for inputting the density data; first generation means for generating the sum of levels of a plurality of color components of the density data inputted by the input means; second generation means for generating a color correction parameter on the basis of the sum obtained by the first generation means and capability of the image forming apparatus; and color correction means for performing color correction, which limits the sum of the levels of the plurality of color components, on the input density data on the basis of the color correction parameter generated by the second generation means.

It is another object of the present invention to provide an image processing apparatus and method capable of warning a user of controlling signal levels when the input image signal levels are to be controlled on the basis of a destination device.

According to the present invention, the foregoing object is attained by providing an image processing apparatus for controlling levels of input image signals depending upon a destination device to which the image signals are outputted, the apparatus comprising: first generation means for generating the sum of input image signal levels of each of color components; second generation means for generating a warning signal when the sum obtained by the first generation means is beyond a capability of the destination device; and control means for controlling the levels of the input image signals in accordance with the sum generated by the first generation means and capability of the destination device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 shows an example of a memory map of a storage medium which stores program codes according to the present invention;

DETAILED DESCRIPTION OF THE PREFERRED EMBODIMENTS

Preferred embodiments of the present invention will be described in detail in accordance with the accompanying drawings.

<First Embodiment>

Figure 1:
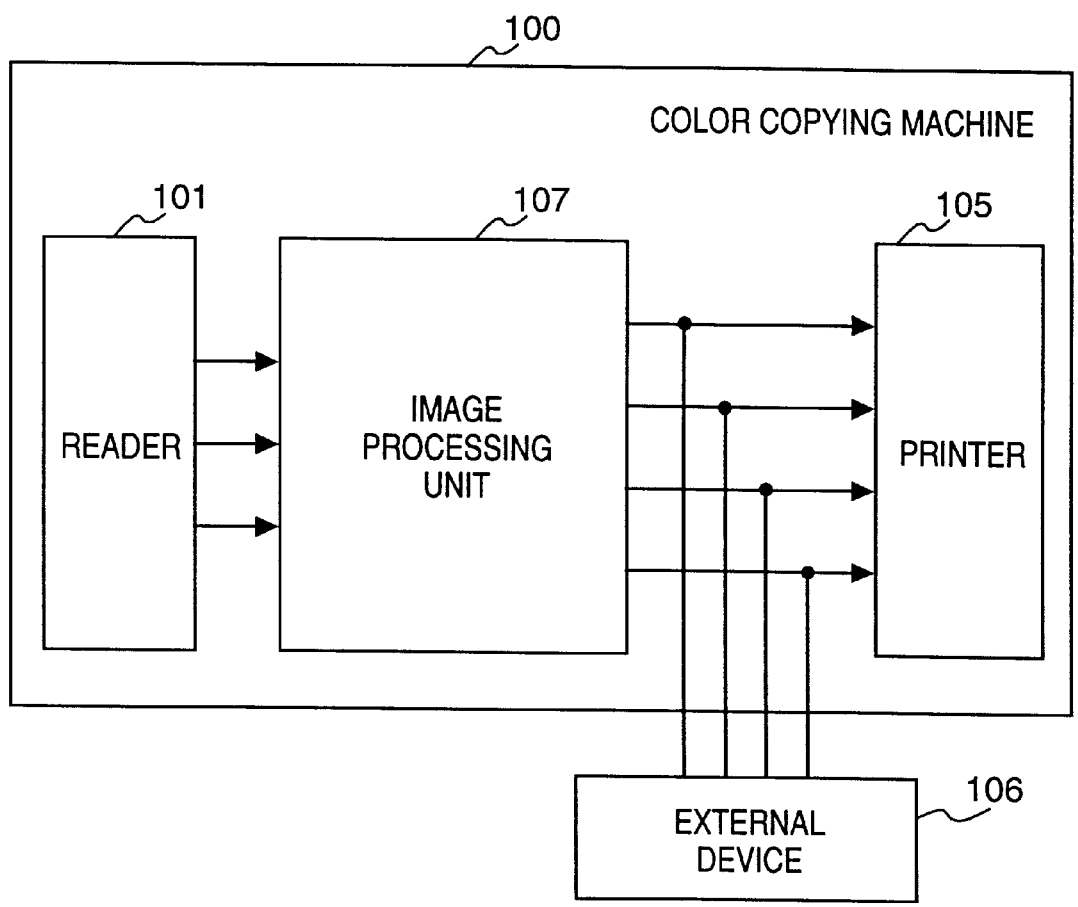
FIG. 1 is a block diagram illustrating a configuration of a color copying machine.
Figure 2:
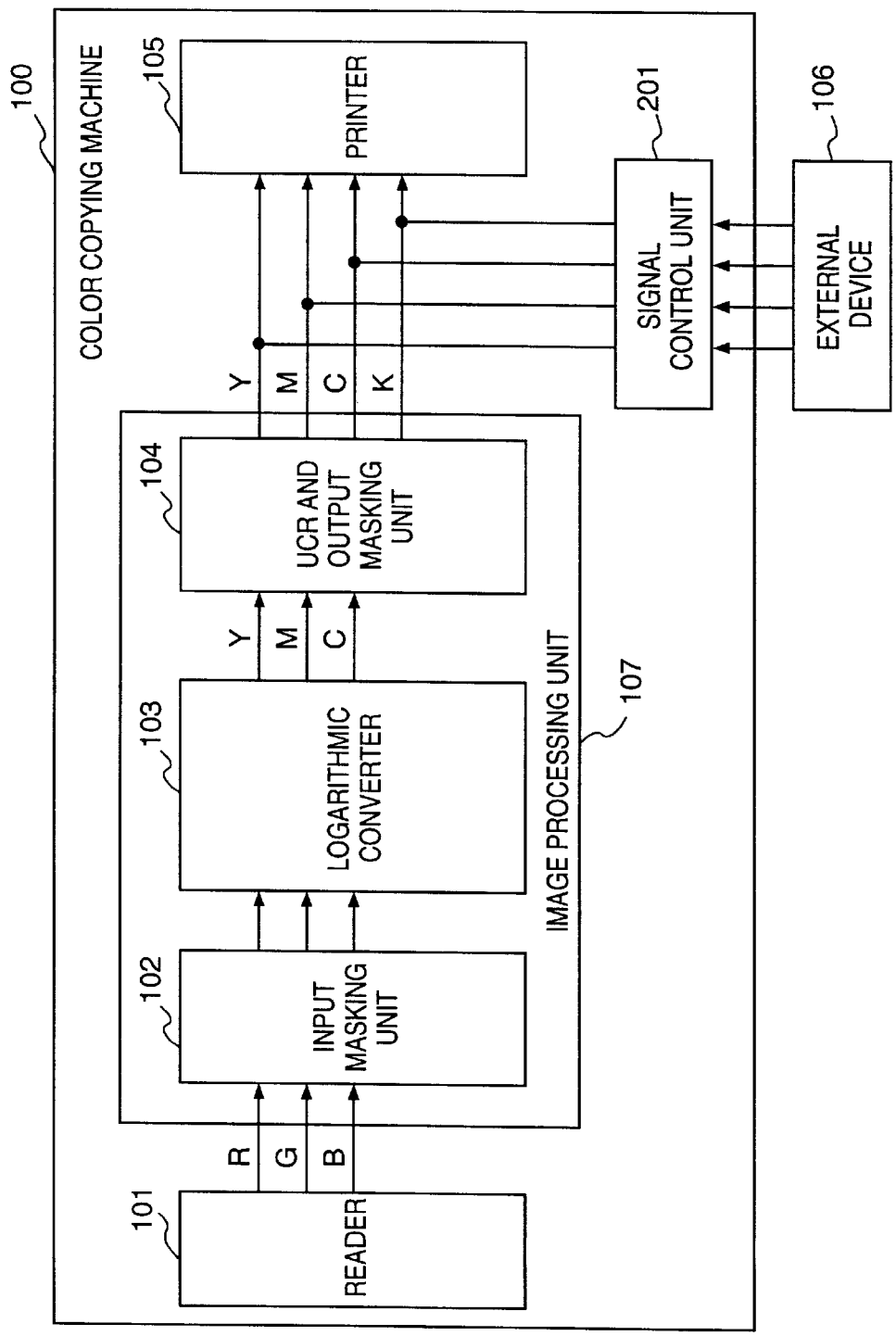
FIG. 2 is a block diagram illustrating a configuration of a color copying machine according to a first embodiment of the present invention.

FIG. 2 is a block diagram illustrating a configuration of a color copying machine 100 according to a first embodiment of the present invention. The same units as those in FIG. 1 are referred to by the same reference numerals and explanations of those are omitted.

First, in a normal copying operation, R, G and B image signals of an original image outputted from the reader 101 are applied with an input masking process by an input masking unit 102 in the image processing unit 107, then logarithmically converted by a logarithmic converter 103, thereby changed into C, M and Y image signals. The C, M and Y image signals are applied with an under color removal process and an output masking process in a UCR output masking unit 104, then outputted to the printer 105 as C, M, Y and K image signals.

In the normal copying operation, the UCR value and masking coefficients are predetermined in the UCR output masking unit 104 so that the image signal levels would be within the capability of the printer 105. Therefore, there is no possibility of any image signals whose levels exceed the capability of the printer 105 being inputted to the printer 105.

Next, an image forming operation based on C, M, Y and K image signals inputted from the external device 106 will be explained. The C, M, Y and K image signals inputted from the external device 106 are controlled to signal levels within the capability of the printer 105 by a signal control unit 201, then outputted to the printer 105. Therefore, regardless of levels of C, M, Y and K image signals inputted from the external device 106, signals outputted to the printer 105 are within the capability of the printer 105.

Figure 3:
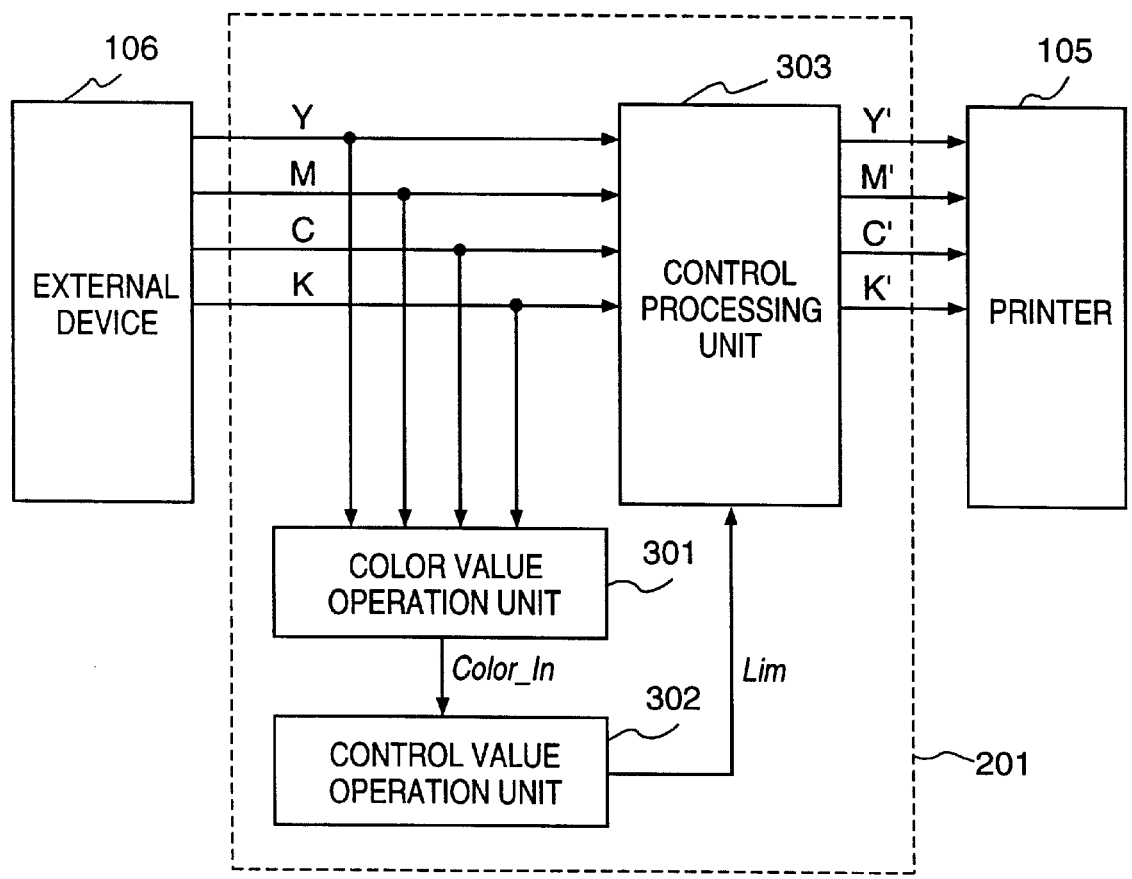
FIG. 3 is a block diagram illustrating a detailed configuration of a signal control unit shown in FIG. 2.

FIG. 3 is a block diagram illustrating a detailed configuration of the signal control unit 201.

Reference numeral 301 denotes a color value operation unit 301 for generating the sum of the color component values which indicates the levels of the C, M, Y and K image signals sent from the external device 106, by pixel. The sum of the color component values is called "the total value of colors", hereinafter. More specifically, when the sum of the color signal values sent from the external device 106 is denoted by Sum_In, the total value of colors, Color_In generated in the color value operation unit 301 is defined by the following equation if an eight-bit signal represents each color.

$$\text{Color\_In} = \text{Sum}_{In}/255 \quad \ldots (1)$$

A control value operation unit 302 is for finding how much of the C, M, Y and K image signal values sent from the external device 106 need to be controlled so as to be within the capability of the printer 105. In a case where an eight-bit signal represents each color and a value obtained by dividing the maximum input level of the printer by 255 is denoted as an indicator showing the capability of the printer, the maximum color value Color_Lim can be denoted by the indicator (e.g., 2.7 colors). Then, the limitation value (control value) Lim which is generated by the control value operation unit 302 can be expressed by the following equation.

$$\text{Lim} = \text{Color\_Lim}/\text{Color\_In} \qquad \ldots (2)$$

Of course, if the total value of colors of the input image signals does not exceed the maximum color value Color_Lim which shows the capability of the printer (Color_In≦Color_Lim), there is no need to limit the levels. In such a case, Lim is decided to be 1.0 so that the levels of input image signals are not limited.

A control processing unit 303 converts the input image signals into signals whose levels are within the capability of the printer 105 in accordance with the following equations on the basis of the limitation value Lim.

$$\left.\begin{array}{l} C' = C \times \text{Lim} \\ M' = M \times \text{Lim} \\ Y' = Y \times \text{Lim} \\ K' = K \times \text{Lim} \end{array}\right\} \qquad (3)$$

According to this process, it is possible to maintain color balance of the input image signals. For example, in a case where all the input image signals have a value, 255, then the total value of colors Color_In of the input image signals is 4.0 colors. Since this value exceeds the maximum color value, 2.7, of the printer 105, thus the control value Lim is 2.7/4.0=0.675. Then, each of the input image signals is limited to the value, 255×0.675=172 in the control processing unit 303.

According to the first embodiment as described above, the color value of the image input signals are limited to less than 2.7 colors. Accordingly, the color value falls into the range within the capability of the printer 105, thus it is possible to obtain an output image of good quality without transfer error or fixing error. Therefore, the capability of the image forming apparatus (color copying machine 100) can be utilized at its maximum.

Further, if pixels have total values of colors which do not exceed the maximum color value, and their image signal values are not limited and reproduced faithfully. Therefore, if an image contains many pixels whose total values of colors do not exceed the maximum color value, the image represented by the input image signals can be reproduced faithfully.

It should be noted that the printer 105 forms an image by forming C, M, Y and K frames separately, thus in a case where the printer has page memories for each of C, M, Y and K frames, a color image can be formed by performing the above-described processing once both in a normal copying operation and in an image forming operation based on input image signals. In contrast, if the printer 105 does not have the page memories, the above described processing has to be repeated four times in order to produce a single color image.

In the above description, a case where the control value Lim for input image signals is generated by pixel is explained, however, it is also possible to limit levels of the input image signals by using a table storing combinations of input values and output values from the control processing unit 303.

<Second Embodiment>

A second embodiment of the present invention will be described below. Note, in the second embodiment, the same units and element as those in the first embodiment are referred by the same reference numerals and explanations of those are omitted.

A method of limiting signal levels by pixel is explained in the aforesaid first embodiment, and in the second embodiment other method of limiting signal levels is described.

Figure 4:
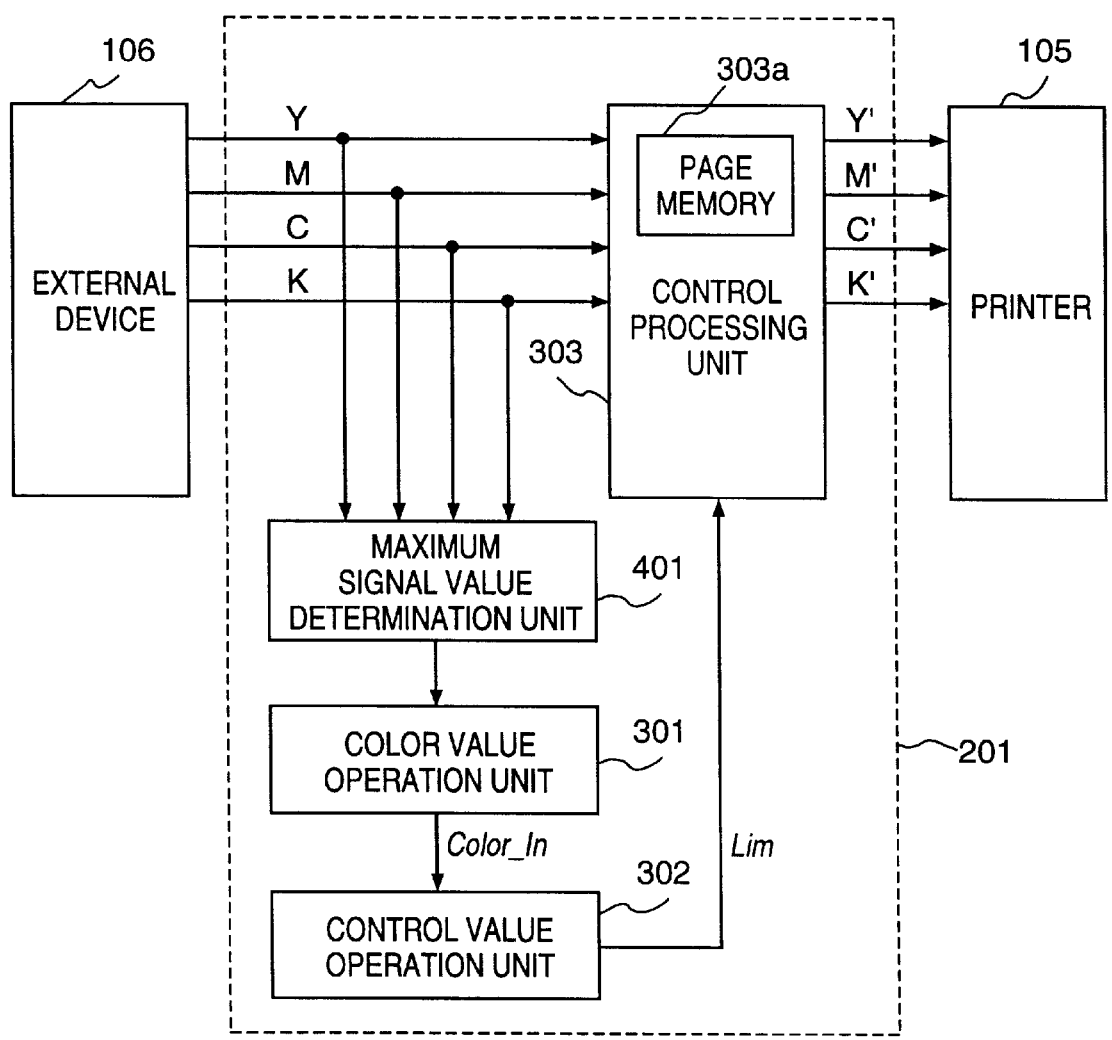
FIG. 4 is a block diagram illustrating a configuration of a signal control unit according to a second embodiment of the present invention.

FIG. 4 is a block diagram illustrating a configuration of a signal control unit 201 according to the second embodiment.

A maximum signal value determination unit 401 determines the maximum signal values for each of C, M, Y and K signals among all the input image signals of an image. The color value operation unit 301 generates the total value of colors, Color_In, of the output maximum signal values, Cm, Mn, Ym and Km, outputted from the maximum signal value determination unit 401. The total value of colors Color_In is defined by the following equations if each color is represented by an eight-bit signal.

$$\text{Color\_In} = \text{Sum\_In}/255 \qquad \ldots (4)$$

$$\text{Sum\_In} = Cm + Mm + Ym + Km \qquad \ldots (5)$$

The control value operation unit 302 gene rates the control value Lim by using the equation (2) as in the first embodiment. Further, the control processing unit 303 converts input image signals into signals whose levels are within the capability of the printer 105 by using the equation (3) on the basis of the control value Lim, also as in the first embodiment. In the second embodiment, however, the control processing unit 303 temporarily stores C, M, Y and K image signals for at least one page which are sent from the external device 106 in a memory 303a, then converts the stored C, M, Y and K image signals by using the single control value Lim. According to the second embodiment, the control processing unit 303 has to have the page memory 303a for temporarily storing input image signals of at least one page. However, since the limitation of signal levels using a single control value Lim is applied to the whole image represented by the input image stored in the page memory 303a, it becomes possible to limit signal levels while maintaining tones of the input image. Therefore, it is possible to output an image having the same tone as the input image.

<Third Embodiment>

A third embodiment of the present invention will be described below. Note, in the third embodiment, the same units and element as those in the first embodiment are referred by the same reference numerals and explanations of those are omitted.

Figure 5:
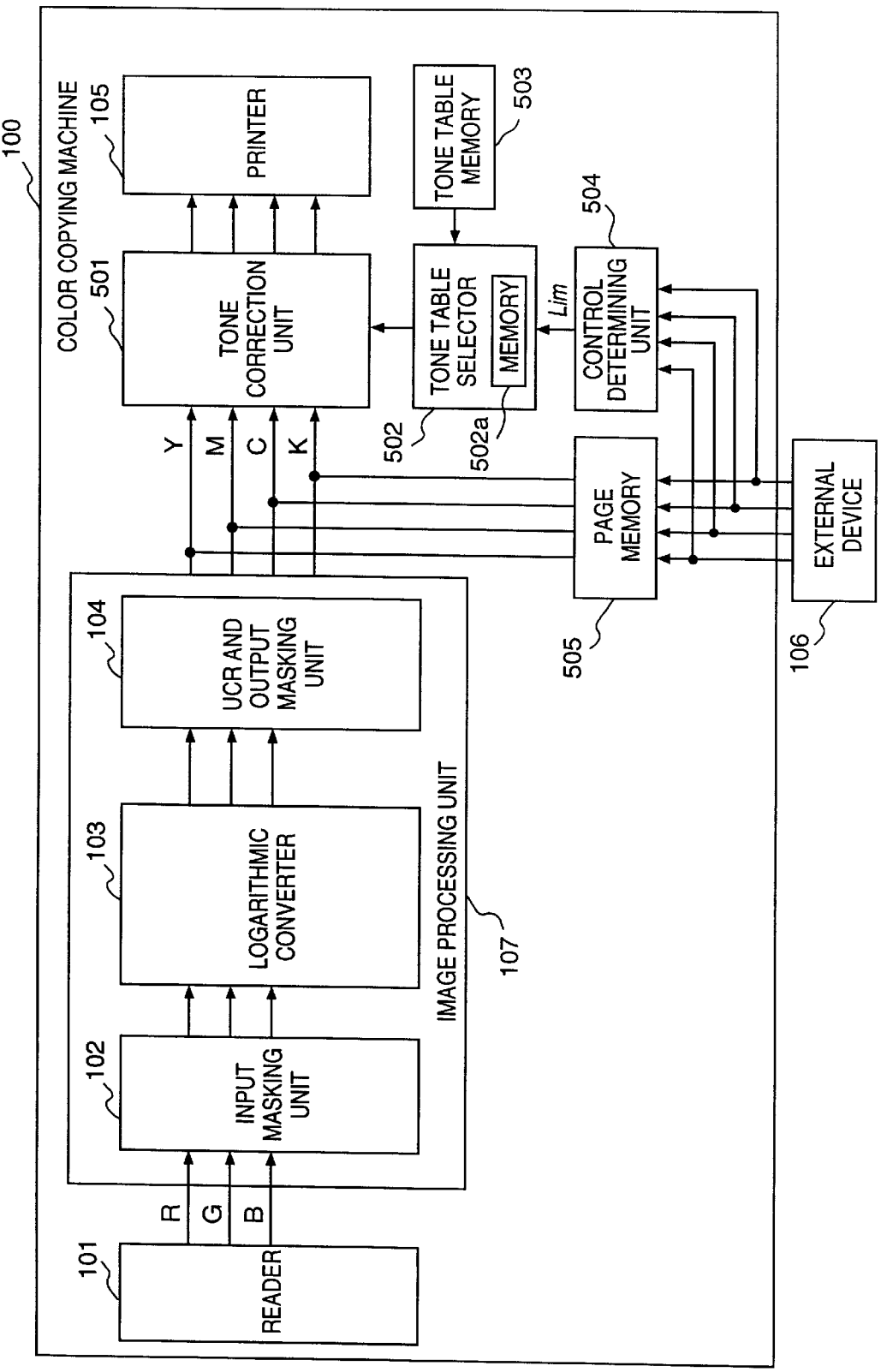
FIG. 5 is a block diagram illustrating a configuration of a color copying machine according to a third embodiment of the present invention.

FIG. 5 is a block diagram illustrating a configuration of a color copying machine 100 according to the third embodiment of the present invention. In FIG. 5, a tone correction unit 501 is for correcting image signals inputted from the UCR output masking unit 104 in accordance with the tone characteristic of the printer 105 in the normal copying operation.

In an image forming operation based on the image signals inputted from the external device 106, the input image signals are stored in a page memory 505 as well as determined whether or not they are within the capability of the printer 105 by an control determining unit 504. A gamma table selector 502 selects a gamma table suitable to the input image signals from a gamma table memory 503 on the basis of the output from the control determining unit 504 (for example, the maximum of the total value of colors of pixels in the entire image), then sets it in the tone correction unit 501. After the gamma table is set, the image signals are read out from the page memory 505 and their signal levels are corrected by the tone correction unit 501. Accordingly, the input image signals are controlled to be signal levels within the capability of the printer 105, thereafter outputted to the printer 105.

Figure 6:
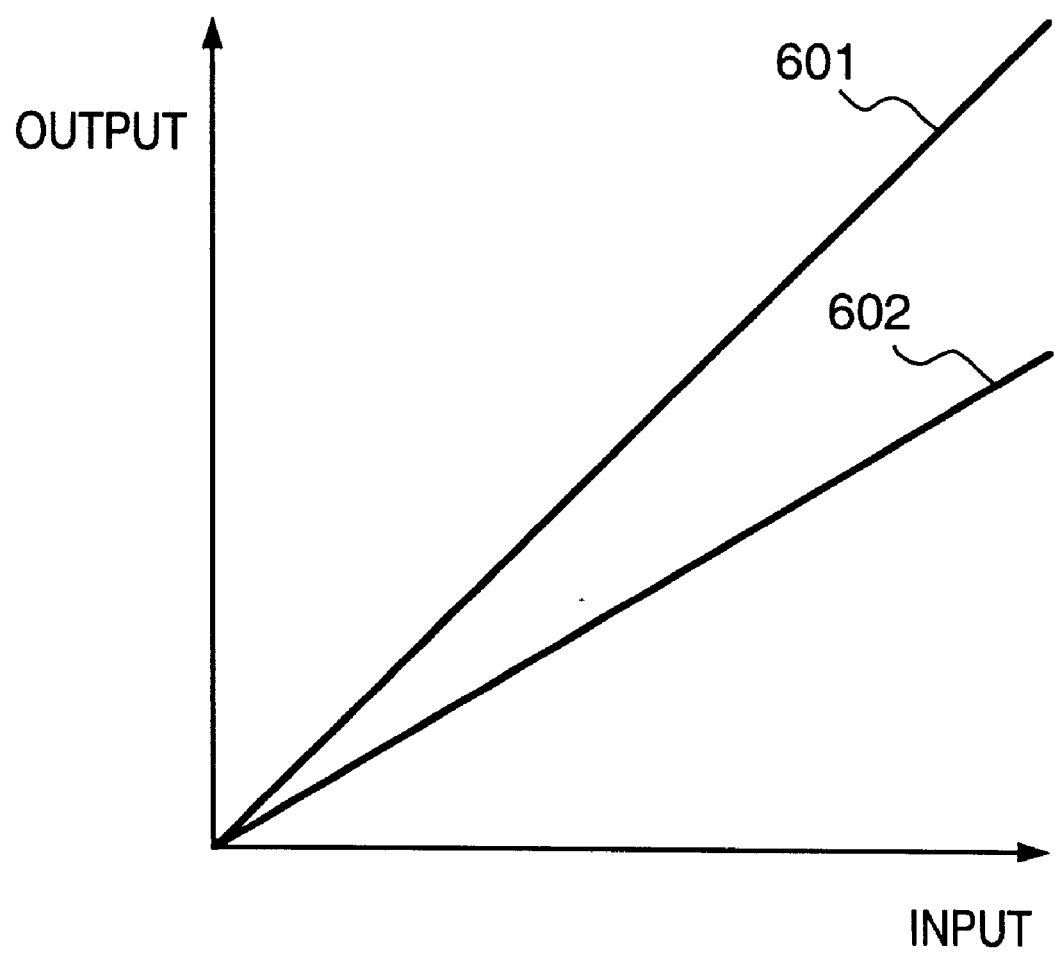
FIG. 6 is a graph representing characteristics of conversion tables to be set in a tone correction unit shown in FIG. 5.

Regarding the normal copying operation, a case where correction depending upon the tone characteristic of the printer 105 is unnecessary, in other words, a case where a gamma control table has a linear relationship represented by a line 601 in FIG. 6 will be described for the sake of simplicity.

First, the control determining unit 504 generates the sum of the signal values, Sum_In, of image signals sent from the external device 106.

$$\text{Sum\_In} = C + M + Y + K \qquad \ldots (6)$$

Next, the control determining unit 504 generates how much the input image signals have to be controlled so as to be within the capability of the printer 105. When it is assumed that the maximum input level of the printer is an indicator of the maximum signal value of the capability of the printer and when the indicator is denoted by PRN_Lim (eight-bit signal for each color, totals to 689), then the control value Lim can be obtained from the following equation.

$$\text{Lim} = \text{PRN\_Lim}/\text{Sum\_In} \qquad \ldots (7)$$

The gamma table selector 502 temporarily stores the control values Lim for each pixel in a memory 502a, then selects a gamma table which is used to convert the input image signals into signals within the capability of the printer 105 from the gamma table memory 503 on the basis of the minimum value of the control value Lim, for example. In a case where each of C, M, Y and K image signals is 255, for example, since the maximum input level in the capability of the printer 105 is 689, the control value Lim is, Lim=689/1020=0.675. In other words, a gamma table which has a characteristics of a line 602, shown in FIG. 6, whose slope γ is 0.675 is selected. Note, there is no need to limit image signal levels when the control value Lim is equal or greater than 1.0, therefore a gamma table which has a characteristics of the graph 601, shown in FIG. 6, whose slope γ is 1.0 is selected.

According to the third embodiment as described above, besides the same advantages as obtained in the first embodiment, an advantage to control levels of input image signals in accordance with destination device can be achieved at relatively low cost by using the tone correction unit 501, provided in the color copying machine 100, as means for controlling levels of image signals inputted from the external device 100.

Further, in a case where the image processing unit 107 has a page memory, it is possible to store the image signals inputted from the external device 106 in the page memory of the image processing unit 107 instead of the page memory 505.

Furthermore, it is possible to provide the gamma table selector 502, the gamma table memory 503 and the control determining unit 504 in the external device 106. In this configuration, the external device 106 can determine whether or not levels of image signals to be printed are within the capability of the printer 105, selects and sets a gamma table which is suitable to the image signals in the tone correction unit 501 on the basis of the determination result, then outputs the image signals to the color copying machine 100. In this case, the page memory 505 is not needed.

<Fourth Embodiment>

A fourth embodiment of the present invention will be described below. Note, in the fourth embodiment, the same units and element as those in the first embodiment are referred by the same reference numerals and explanations of those are omitted.

Figure 7:
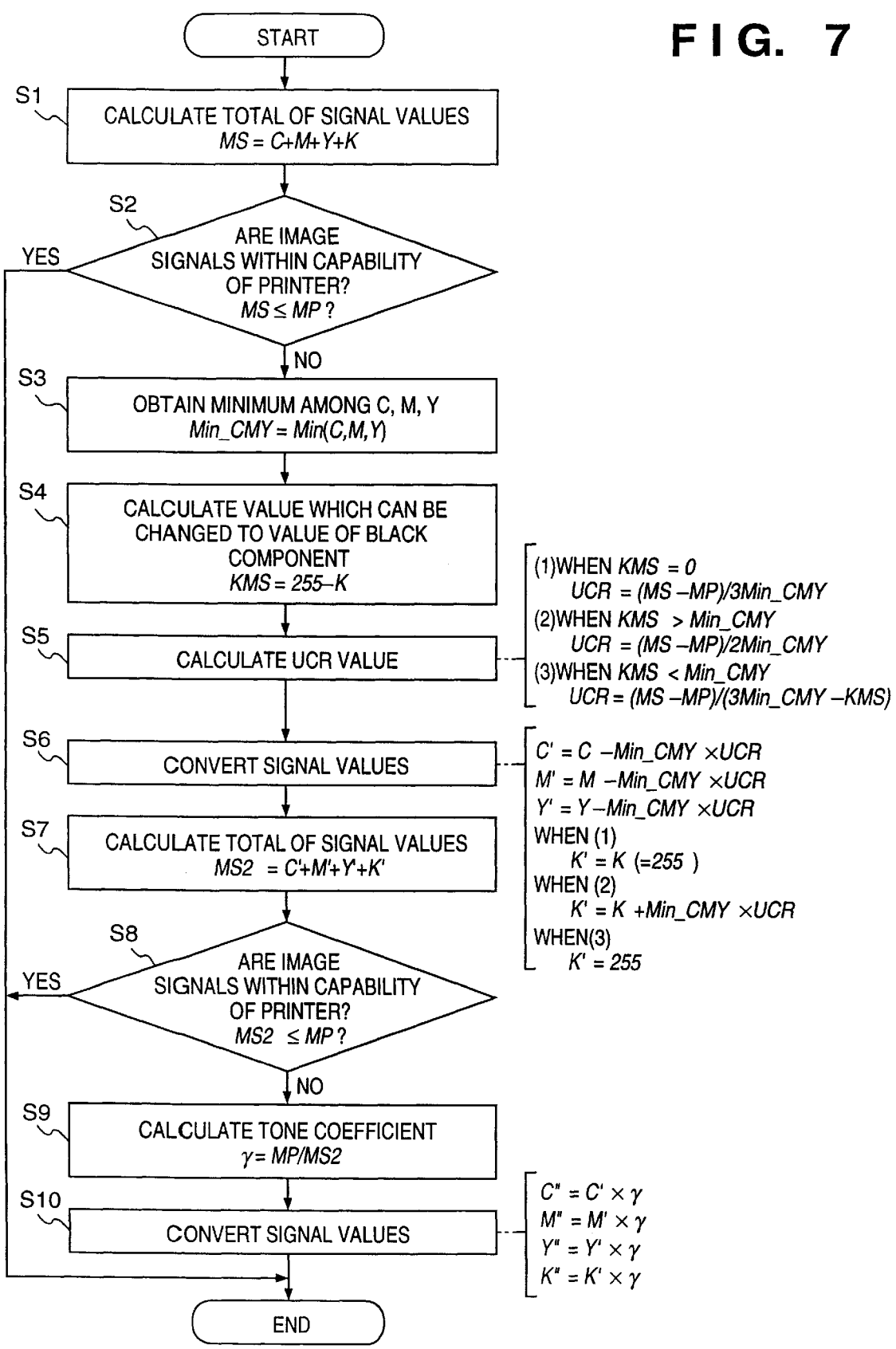
FIG. 7 is a flowchart showing an operational sequence of a signal control processing according to a fourth embodiment of the present invention.

The fourth embodiment is directed to how to realize the same function performed by the signal control unit 201 by using software. FIG. 7 is a flowchart showing a sequence of the signal control processing of the fourth embodiment, in other words, a sequence for limiting signal levels by pixel.

First at step S1, the total MS of C, M, Y and K image signal values sent from the external device 106 is generated. Then at step S2, the total MS and the maximum input level MP of the printer 105 are compared to determine whether the total MS indicates that the image signals are within the capability of the printer 105. If the image signals are within the capability of the printer 105 (i.e., MS≦MP), then the process is completed (proceeds to the next pixel), whereas if they are beyond the capability of the printer 501 (i.e., MS>MP), then the process proceeds to step S3.

Next at step S3, the minimum value, Min_CMY, of C, M and Y signals are obtained in order to perform UCR (under color removal) process once more, then at step S4, a signal value KMS which can be transfer to a black (K) component value is generated. Thereafter, a UCR value is determined in accordance with the signal value KMS at step S5, then the C, M, Y and K signals are converted into C', M', Y' and K' signals on the basis of the determined UCR value at step S6.

A method of determining the UCR value and signal conversion will be described below.

Figure 8:
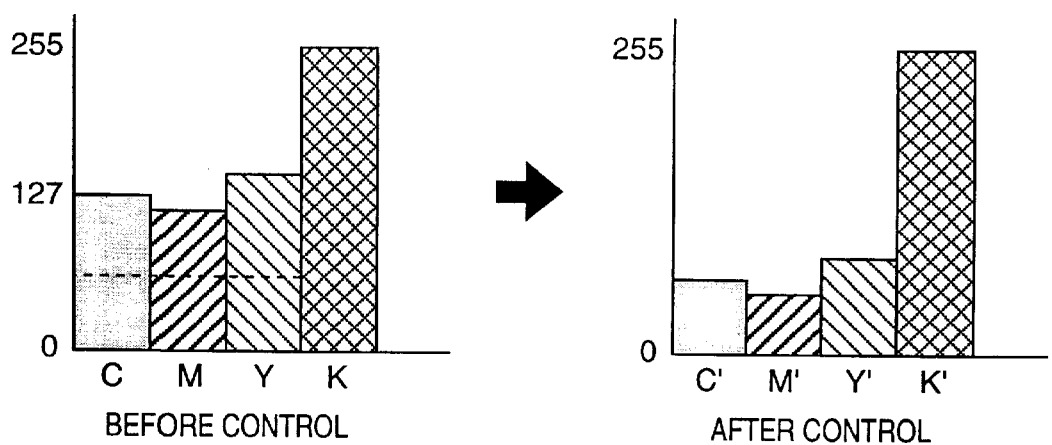
FIG. 8 is an explanatory view for a method of deciding a UCR value and signal conversion.

As an example shown in FIG. 8, in a case where the K signal value has the maximum value (e.g., 255) and a signal value KMS which can be transferred to a black component value is 0, then the UCR value which can maintain the K component value while limiting the levels of the C, M and Y signals within the capability of the printer 105 has to be obtained.

$$UCR = (MS - MP)/3Min\_CMY \qquad \ldots (8)$$

Therefore, the C, M, Y and K signals after a control process are, $$\left.\begin{array}{l} C' = C - \text{Min\_CMY} \times UCR \\ M' = M - \text{Min\_CMY} \times UCR \\ Y' = Y - \text{Min\_CMY} \times UCR \\ K' = K( = 255) \end{array}\right\} \qquad (9)$$

Figure 9:
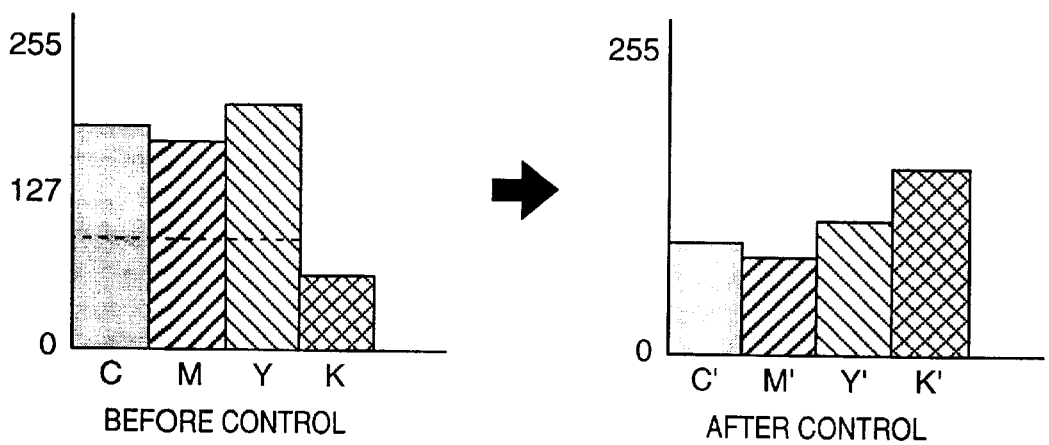
FIG. 9 is an explanatory view for a method of deciding a UCR value and signal conversion.

When the signal value KMS is larger than Min_CMY as an example shown in FIG. 9, then the UCR value is obtained in accordance with the following equation.

$$UCR = (MS - MP)/2Min\_CMY \qquad \ldots (10)$$

Therefore, the C, M, Y and K signals after the control process are, $$\left.\begin{array}{l} C' = C - \text{Min\_CMY} \times UCR \\ M' = M - \text{Min\_CMY} \times UCR \\ Y' = Y - \text{Min\_CMY} \times UCR \\ K' = K + \text{Min\_CMY} \times UCR \end{array}\right\} \qquad (11)$$

Figure 10:
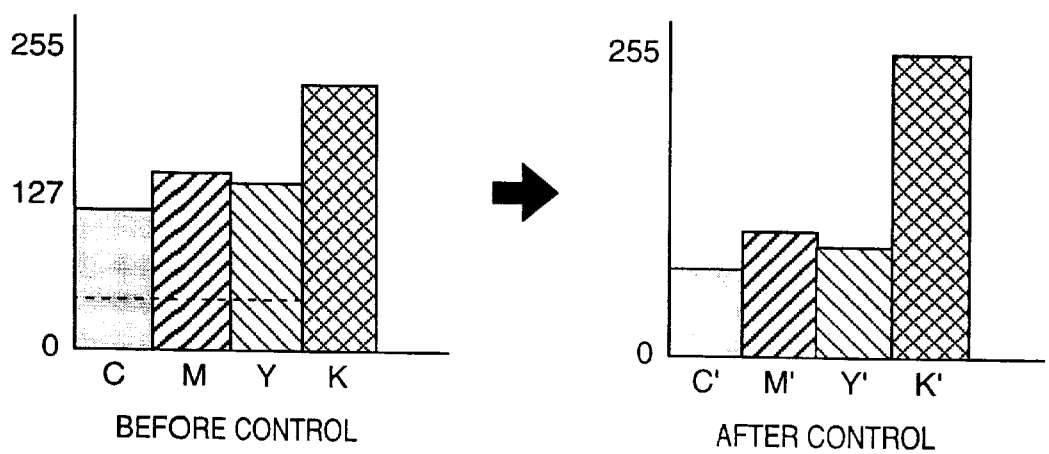
FIG. 10 is an explanatory view for a method of deciding a UCR value and signal conversion.

When the signal value KMS is smaller than Min_CMY as an example shown in FIG. 10, then the UCR value is obtained in accordance with the following equation.

$$UCR = (MS - MP)/(3Min\_CMY - KMS) \quad \ldots (12)$$

Therefore, the C, M, Y and K signals after the control process are, $$\left.\begin{aligned} C' &= C - Min\_CMY \times UCR \\ M' &= M - Min\_CMY \times UCR \\ Y' &= Y - Min\_CMY \times UCR \\ K' &= 255 \end{aligned}\right\} \quad (13)$$

Figure 11:
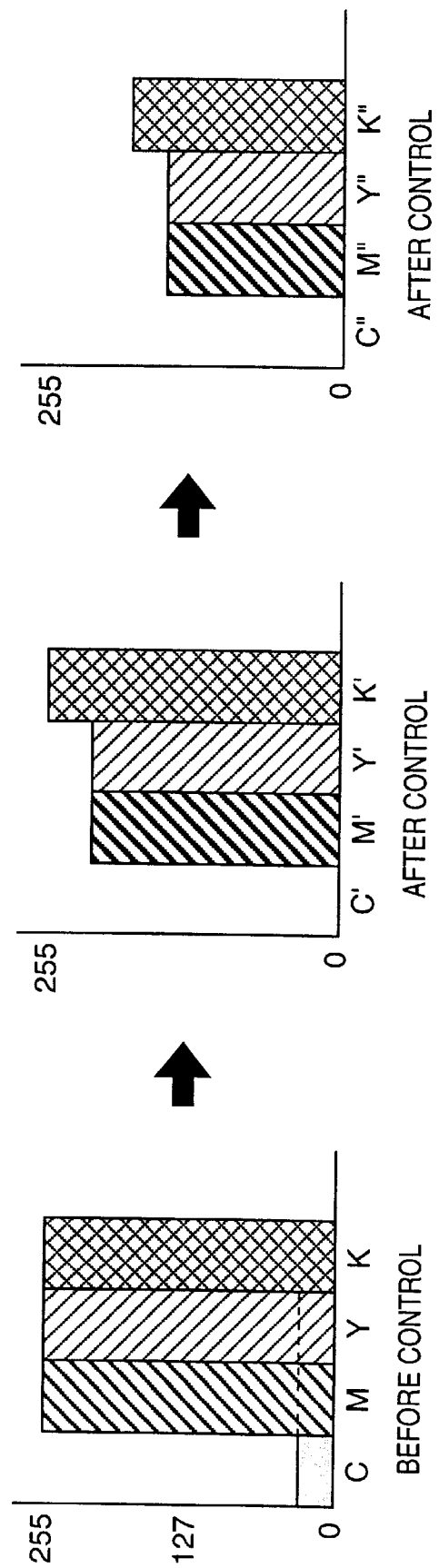
FIG. 11 is an explanatory view for a method of deciding a UCR value and signal conversion.

The signal levels are normally converted to be within the capability of the printer 105 by the step S6. However, in a case shown in FIG. 11, it is not possible to convert the image signals to be within the capability of the printer 105 by the step S6. In such a case, the total value MS2 of the C, M, Y and K image signal values which have been processed is generated at step S7, then at step S8, whether or not the total value MS2 shows that the image signals are within the capability of the printer 105 is determined by comparing the total value MS2 and the maximum input level MP of the printer 105. Then, if the image signals are within the capability of the printer 105 (i.e., MS2≦MP), then the process is completed (proceeds to the next pixel), whereas if they are beyond the capability of the printer 105 (i.e., MS2>BP), then the process proceeds to step S9.

Next at step S9, the tone coefficient γ=MP/MS2 is generated, thereafter the levels of the signals are changed in accordance with the following equations at step S10, and the process is completed.

$$\left.\begin{aligned} C'' &= C' \times \gamma \\ M'' &= M' \times \gamma \\ Y'' &= Y' \times \gamma \\ K'' &= K' \times \gamma \end{aligned}\right\} \quad (14)$$

According to the fourth embodiment as described above, it is possible to perform processes which are suitable to the level of the K component of the input image signal. Further, the levels of the input image signals are within the capability of the printer 105, thereby outputting an image of good reproduction quality without transfer error and fixing error. Further, since the signal levels are reduced by using the under color removal, it is possible to maintain the color valance of the input signals and to realize good reproduction quality. It should be noted that a method of performing under color removal by using the minimum value of the C, M and Y signals is explained in the fourth embodiment, however, the present invention is not limited to this, and other under color removal methods can be applied.

<Fifth Embodiment>

A fifth embodiment according to the present invention will be described below. In the fifth embodiment, the same units and element as described in the first embodiment are referred by the same reference numerals and an explanation of those are omitted.

Figure 13:
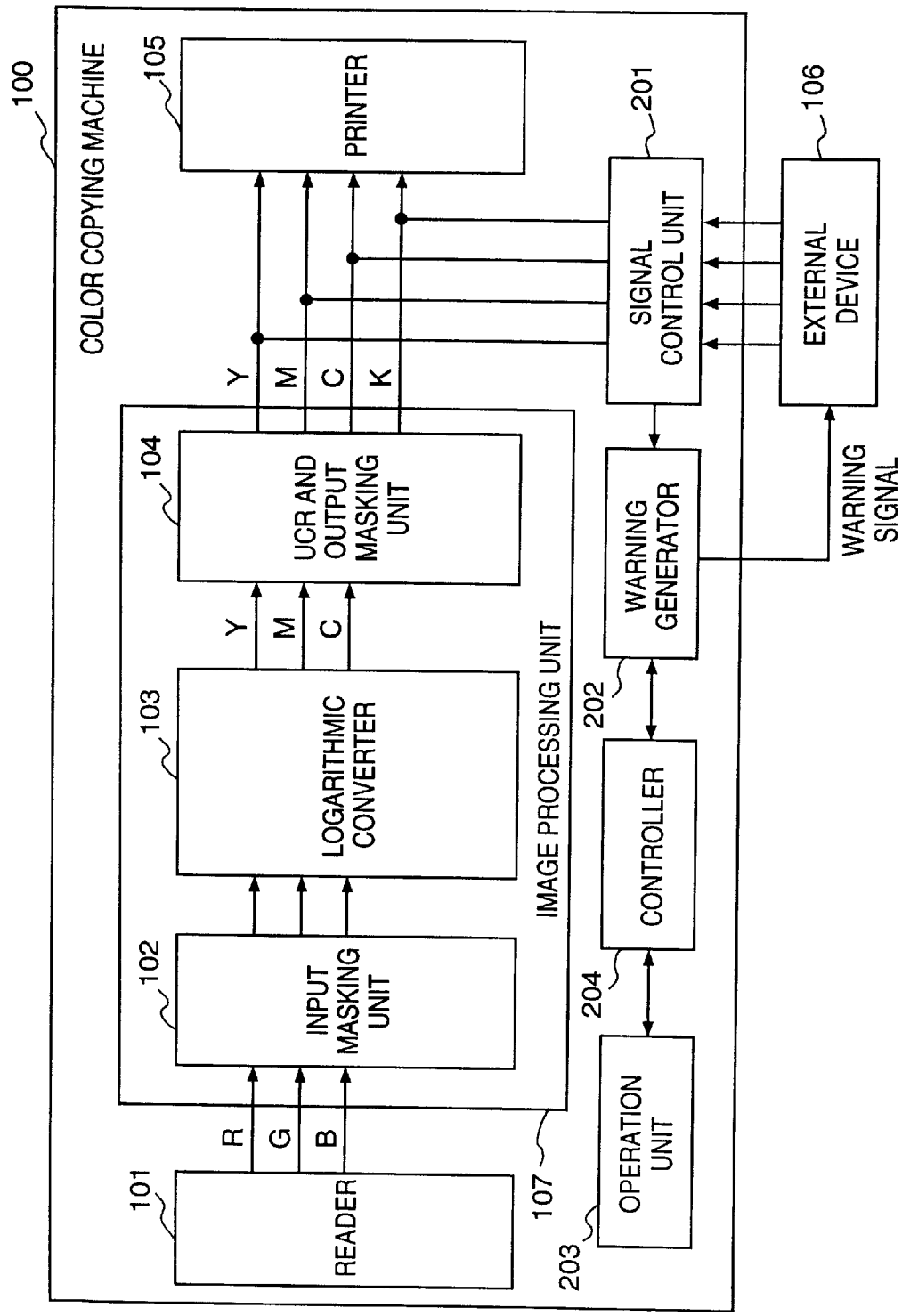
FIG. 13 is a block diagram illustrating a configuration of an image processing apparatus according to a fifth embodiment.
Figure 14:
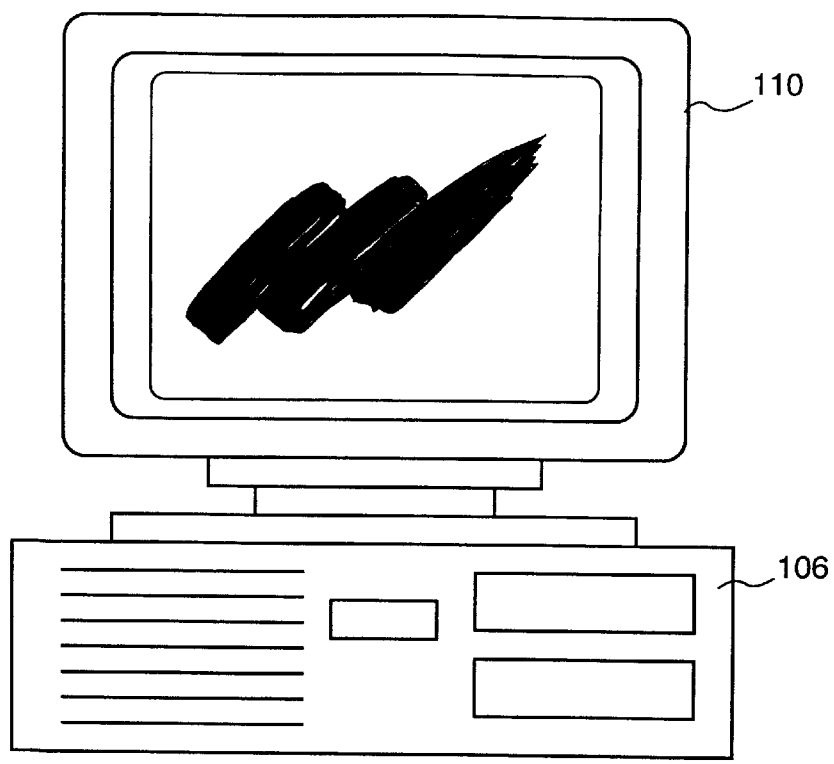
FIG. 14 shows an example of an image outputted from an external device.

FIG. 13 is a block diagram illustrating a configuration of an image processing apparatus according to the fifth embodiment.

Referring to FIG. 13, a warning generator 202 generates a warning signal when the signal control unit 201 controls input image signal levels so as to be within the capability of the printer 105. The warning signal is sent to the external device 106, and a warning indicating that the signal levels are controlled is displayed on a display unit 110, a monitor, such as a color CRT and a color LCD.

Figure 15:
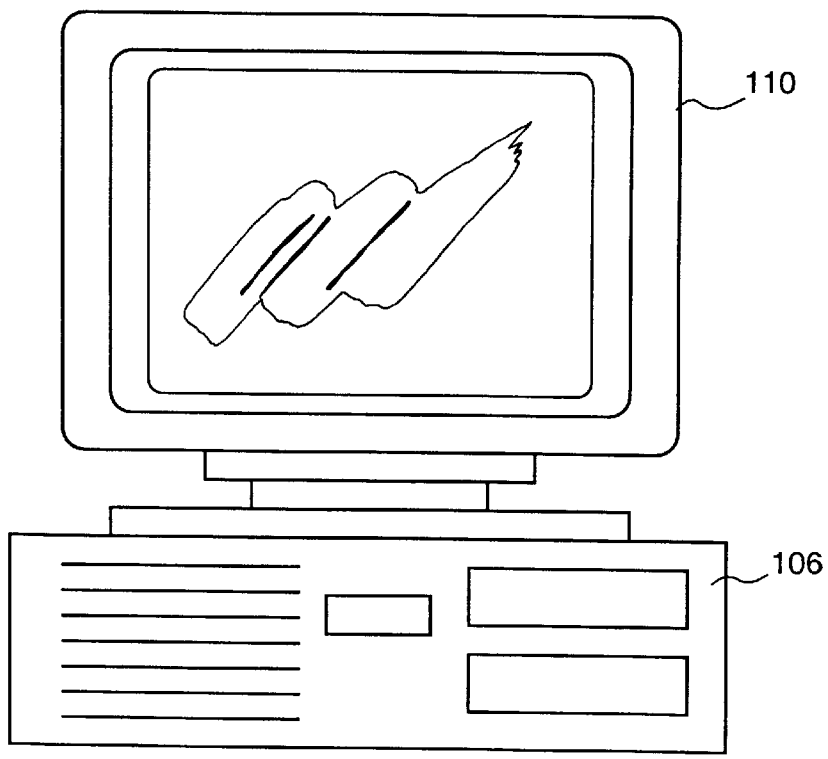
FIG. 15 shows an example of a warning displayed in accordance with a warning signal on a display unit of the external device.
Figure 16:
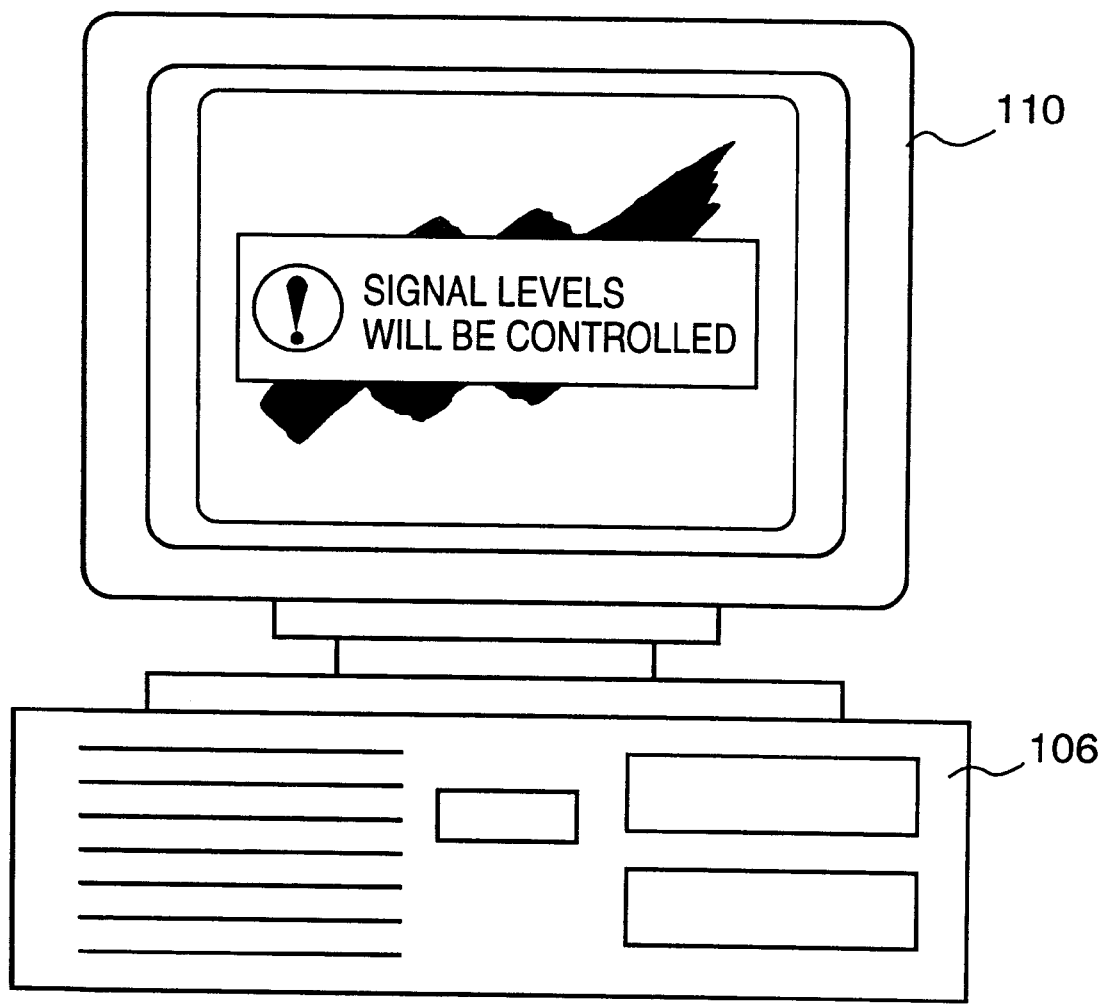
FIG. 16 shows an example of a warning displayed in accordance with a warning signal on the display unit of the external device.

If the warning signal is transmitted from the warning generator 202 when the external device 106 transmits image signals to a color copying machine 100 in order to output the image displayed on the display unit 110 with the printer 105, for example, pixels whose signals levels are controlled can be displayed on the display unit 110 (refer to FIG. 15) in accordance with the warning signal. Note, it is possible to display a warning message on the display unit 110 as an example shown in FIG. 16.

Further, the warning generator 202 sends the warning signal not only to the external device 106 but also to a controller 204. When the controller 204 receives the warning signal, it controls the control processing unit 303 to store the controlled image signals in the page memory 303a until a user issues a command.

Further, it is possible to display a warning message on an operation unit 203 provided in the main body of the color copying machine 100. In other words, any configuration or method can be used as far as a warning to a user of execution of signal level control.

When the user is warned, he/she designates whether a printing operation is to be continued or to be interrupted via the external device 106 or the operation unit 106. When the controller 204 receives the designation from the user, it controls the control processing unit 303 in accordance with the designation. More specifically, in a case of continuing the printing operation, the controller 204 controls the printer 105 to output the controlled image signals stored in the page memory 303a, whereas in a case of interrupting the printing operation, it frees the page memory 303a.

Note, the controller 204 which is constructed with a one-chip microcomputer, for example, controls the entire operation of the color copying machine 100 in accordance with a program stored in an internal ROM as well as executes various kinds of processes by using an internal RAM as a work memory.

Further, the operation unit 203 includes a display, such as an LCD, a touch panel, a keyboard, and the like which is used by a user to designate a operation or operational conditions of the color copying machine 100. The controller 204 displays a state of operation, the set operational conditions of the color copying machine 100, and so on, using the display of the operation unit 203.

Figure 17:
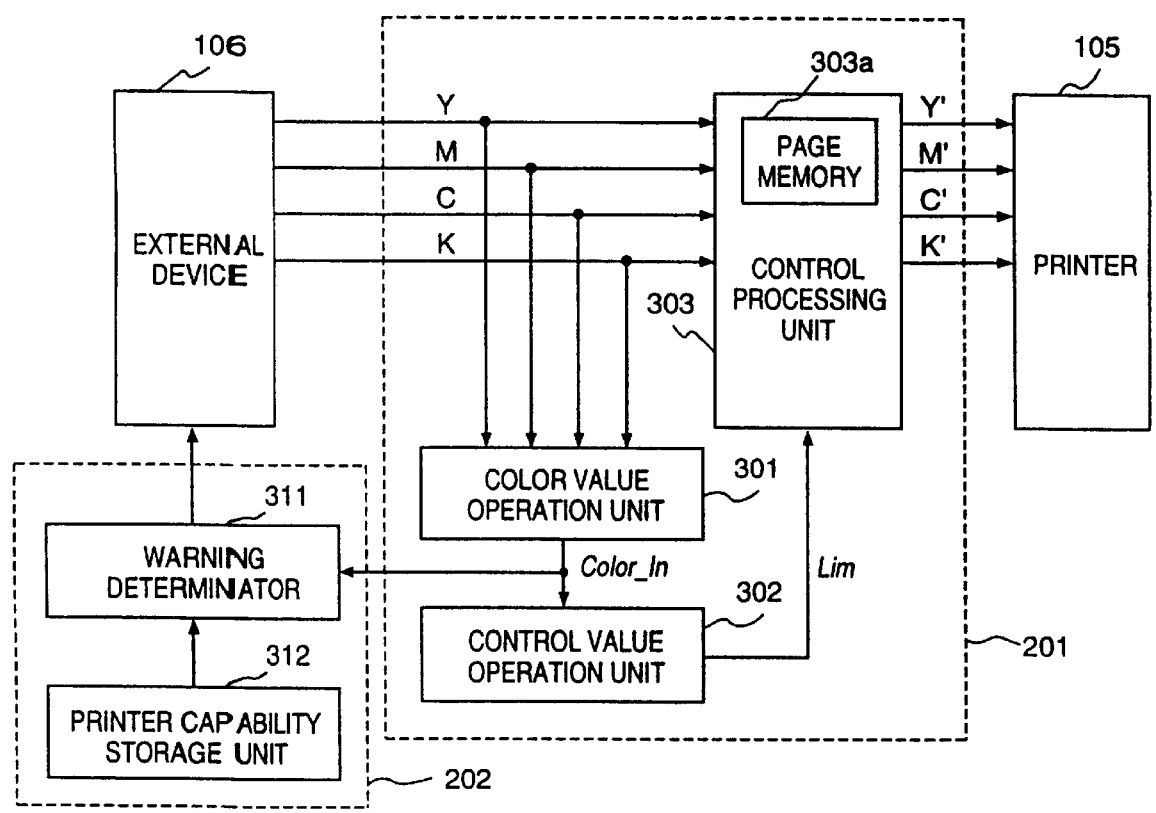
FIG. 17 is a block diagram illustrating a detailed configuration of a signal control unit and a warning generator.

FIG. 17 is a block diagram illustrating a detailed configuration of the signal control unit 201 and the warning generator 202.

Referring to FIG. 17, a warning determinator 311 determines whether C, M, Y and K signals sent from the external device 106 are within the capability of the printer 105 or not on the basis of the total value of colors, Color_In, generated by the color value operation unit 301. If it is determined that signals which exceed the capability of the printer 105 have been transmitted, then the warning determinator 311 generates a warning signal. A printer capability storage unit 312 stores information on the capabilities of various kinds of printers, and information on the capability selected in accordance with the kind of the printer 105 by the controller 204, shown in FIG. 13, is transmitted to the warning determinator 311.

The warning generator 202 having the aforesaid configuration can operate upon reception of data, specifically the total value of colors Color_In, from the signal control unit 201. Therefore, it is possible to realize the warning generator 202 by executing a program representing the functions shown in the flowchart in FIG. 18 with the controller 204. Note, the ROM in the controller 204 replaces the printer capability storage unit 312 in this case.

Figure 18:
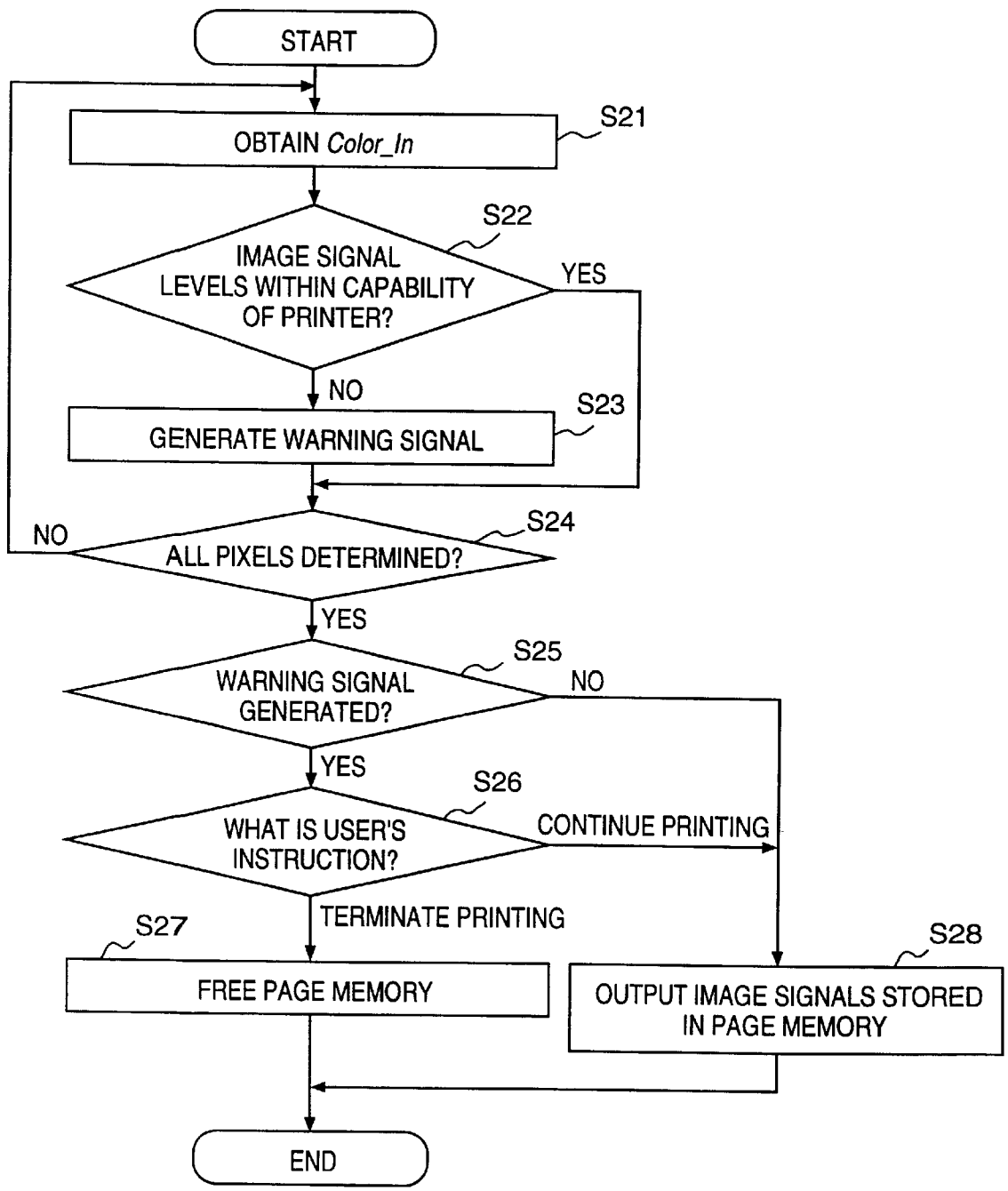
FIG. 18 is a flowchart showing an operation of the warning generator realized by executing software by a controller.

Referring to FIG. 18, after image signals are inputted from the external device 106, the total value of colors Color_In is inputted from the color value operation unit 301 at step S21, and the Color_In is compared with the maximum color value of the printer 105, Color_Lim at step S22. If the comparison results in Color_In>Color_Lim, then it is determined that the levels of the input image signals are beyond the capability of the printer 105 and a warning signal is generated at step S23. Thereafter, in accordance with the judgment at step S24, the steps S21 to S24 are repeated until image signal levels of all the pixels inputted from the external device 106 are determined.

After the determination on all the pixels is completed, the process proceeds to step S25 where whether a warning signal is generated or not is judged. If a warning signal has been generated, then the process waits for an instruction from the user at step S26. In a case where the user instructs to terminate the printing operation, the controller 204 controls the control processing unit 303 to free the page memory 303a at step S27. Further, if no warning signal has been generated or if the user instructs to continue the printing operation, the controller 204 controls the control processing unit 303 to output image signals stored in the page memory 303a to the printer 105.

Further, it is possible to modify the process to proceeds to step S26 and wait for an instruction from the user in a case where a warning signal is generated. It is also possible to set a limit on the number of warning signals generated and control so that the process proceeds to step S26 when the number of warning signals generated is over the limit and to S28 when the number of warning signals generated is less than the limit. In the latter modification, it is possible to prevent the inconvenience of asking the user for an instruction in a case where the levels of only a few pixels are controlled, which may not greatly affect the color of the entire image. The limit may be set in advance, or may be set arbitrarily by the user via the operation unit 203 or the external device 106.

According to the fifth embodiment as described above, it is possible to notify the user of controlling the levels of the image signals, thereby preventing an image from being outputted with colors which the user does not desire.

Furthermore, according to the fifth embodiment, since a warning signal indicating that the level of a pixel is to be controlled is outputted by pixel, an external device which received a warning signal can know which pixel of an image is to be controlled its level on the basis of the warning signal. Therefore, it is possible to display an image showing pixels whose levels are to be controlled if needed.

<Sixth Embodiment>

An image processing apparatus according to a sixth embodiment of the present invention will be described below. In the sixth embodiment, the same units and element as described in the first embodiment are referred by the same reference numerals and explanation of those are omitted.

In each of the afore-described embodiments, the cases where the present invention is applied to an apparatus, such as a color copying machine having a single printer, are explained. The sixth embodiment describes an image processing apparatus which controls the levels of image signals, when needed, upon sending C, M, Y and K signals from an external device 106 to a plurality of color printers and color copying machine connected to a network. Note, the image processing apparatus according to the sixth embodiment is provided in a form of an expansion card or an expansion unit to be inserted into the external device 106, for example.

Figure 19:
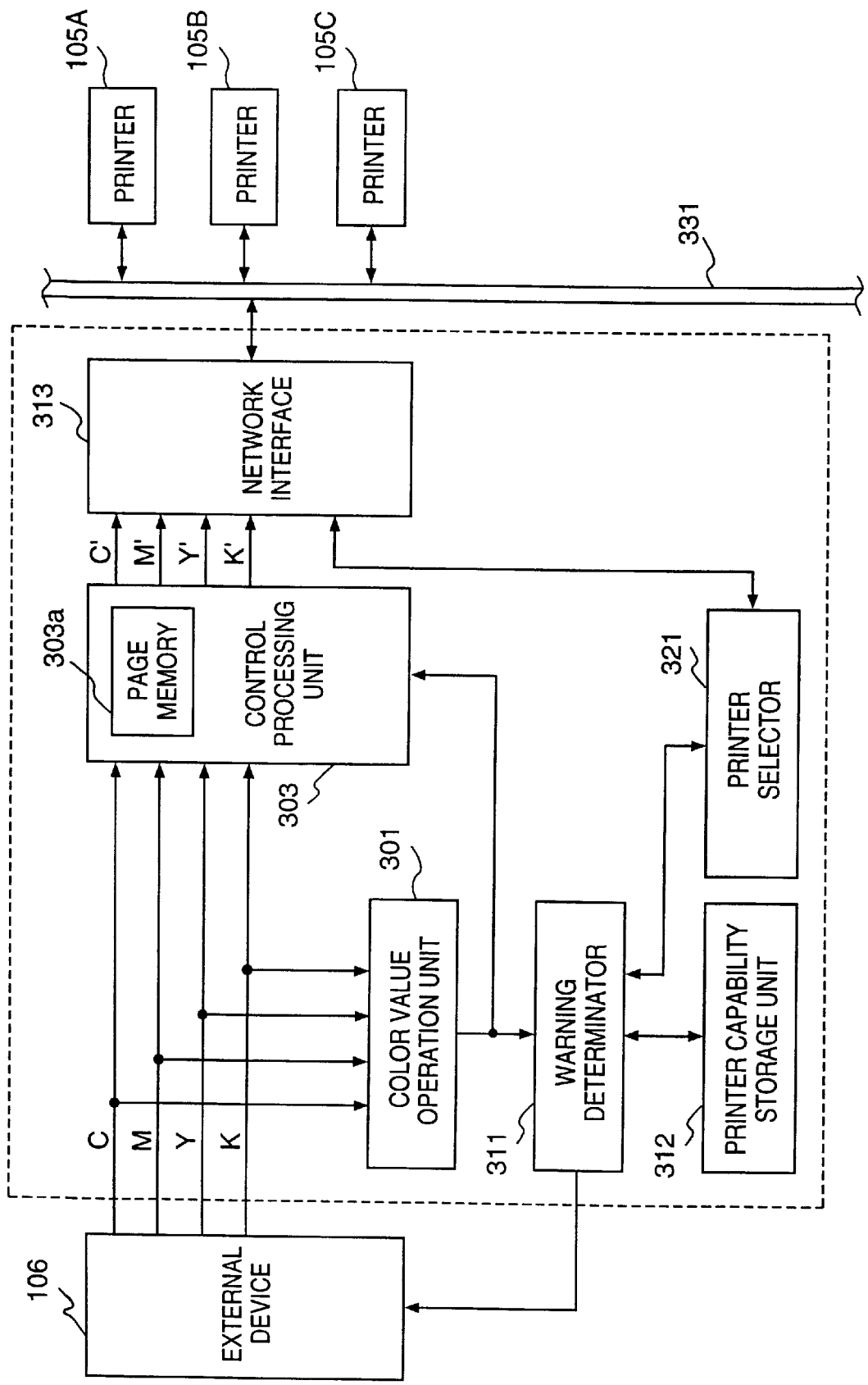
FIG. 19 is a block diagram illustrating a configuration of an image processing apparatus according to a sixth embodiment.

FIG. 19 is a block diagram illustrating a configuration of the image processing apparatus according to the sixth embodiment.

Referring to FIG. 19, the warning determinator 311 determines whether or not C, M, Y and K signals sent from the external device 106 are within the capability of any of the plurality of printers connected to a network 311 on the basis of the total value of colors Color_In generated by the color value operation unit 301. Then, in a case where the sent image signals are beyond the capability, the warning determinator 311 generates a warning signal. In other words, the warning determinator 311 obtains information on kinds of the plurality of printers connected to the network 331 via a printer selector 321 and a network interface 313, reads out the information on the capabilities of the printers from the printer capability storage unit 312 on the basis of the obtained information, and performs the aforesaid determination.

It should be noted that, in a case where information on the capabilities, i.e., the maximum value of colors Color_Lim, of the printers connected to the network 331 can be obtained via the printer selector 321 and the network interface 313, the warning determinator 311 can control the printer capability storage unit 312 to store the obtained information.

Furthermore, in the sixth embodiment, the following two things are determined for every pixel of the input image signals by pixel by comparing the total value of colors Color_In to the maximum color values Color_Lim of a plurality of printers: (1) Whether there is any printer with which the input image is outputted without controlling the input image signals; and (2) With which printer an image can be outputted with minimum signal level control performed on the input image signals (such printer is called "most suitable printer", hereinafter). These determination results in two cases: a case in which the input image signals are outputted without being controlled; and a case in which input image signals are controlled so as to be within the capability of the most suitable printer. Therefore, it is necessary to store the C, M, Y and K signals unprocessed, sent from the external device, in the page memory 303a.

When the warning determinator 311 determines that the image signals sent from the external device 106 are within the capability of the printer 105A, for example, connected to the network 331, then it controls the printer selector 321 so that image signals, whose levels are unprocessed, stored in the page memory 303a are transmitted to the printer 105A via the network interface 313.

Further, when the warning determinator determines that the image signals sent from the external device 106 are beyond the capabilities of all the printers connected to the network 331 then the process waits for an instruction from the user as in the fifth embodiment. Then, in a case where the user instructs to print the image, the warning determinator 311 controls the printer selector so that the image signals are transmitted to a printer 105B via the network interface 313 as well as controls the control processing unit 303 to process the levels of the C, M, Y and K signals stored in the page memory 303a so as to be within the capability of the printer 105B, i.e., the most suitable printer, for example. Therefore, image signals whose levels are controlled are sent to the printer 105B. Note, as for the method of controlling the signal levels, any one of the methods explained in the aforesaid embodiments can be used.

Further, the warning determinator 311 transmits the image signals to a printer (e.g., printer 105C) selected in advance in a case where the image signals sent from the external device 106 are within the capabilities of all the printers connected to the network 331. In other words, by controlling the printer selector 321, the image signals, stored in the page memory 303a, whose levels are not controlled are transmitted to the printer 105C via the network interface 313.

Figure 20:
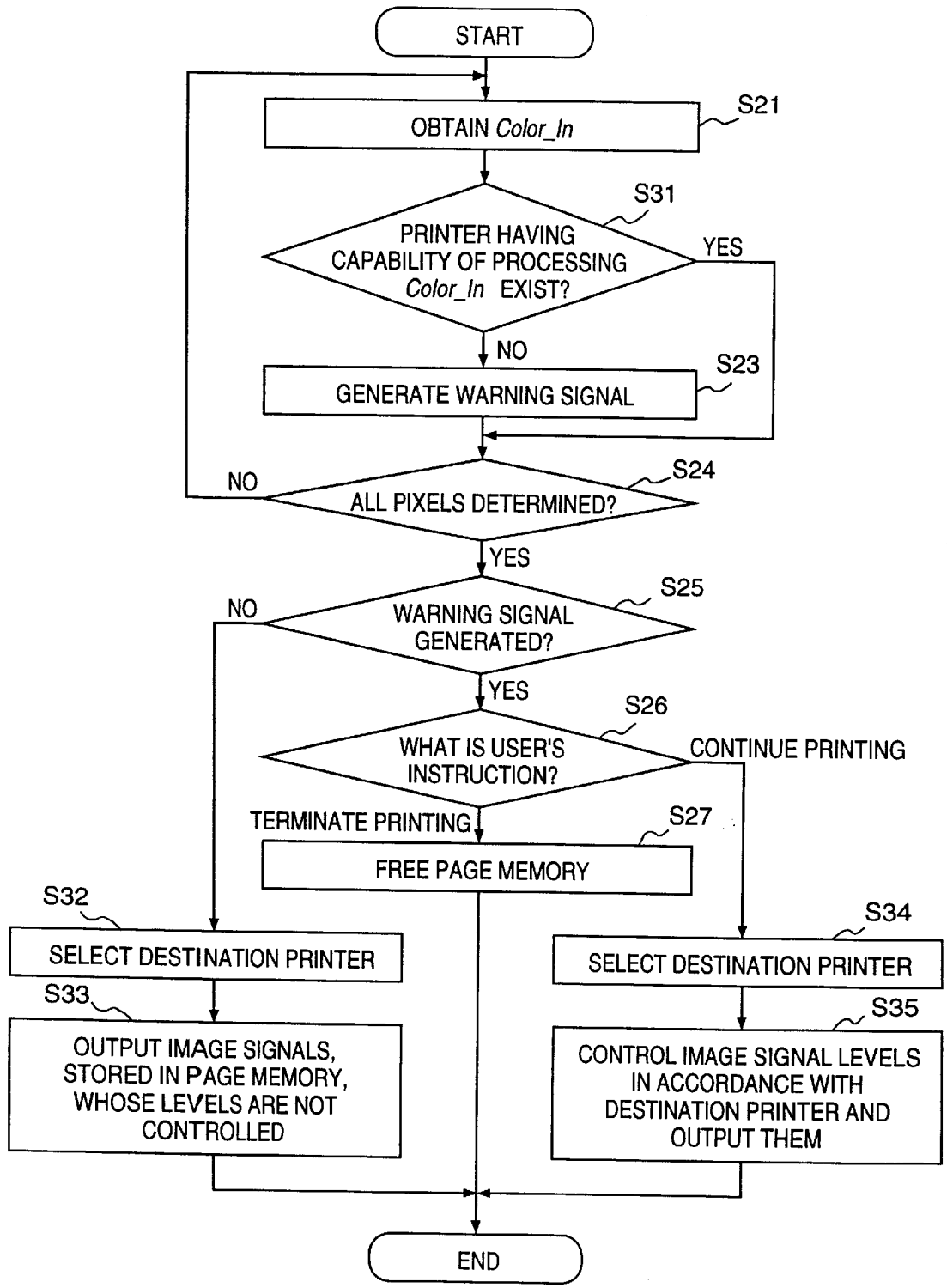
FIG. 20 is a flowchart showing an operational sequence performed by a warning determinator.

FIG. 20 is a flowchart showing an operational sequence performed by the warning determinator 311. In FIG. 20, the same steps as in FIG. 18 are referred to by the same reference numerals and the explanation of those steps are omitted.

In the sixth embodiment, whether or not the total value of colors Color_In is within the capability of any of the plurality of printers connected to the network 331 is determined at step S31. If there is no printer having capability of processing Color_In, then a warning signal is generated at step S23. Note, the warning determinator 311 stores the determination result at step S31 in a table assigned in RAM, or the like, so as to use the determination result as data for selecting the most suitable printer.

Further, in a case where no warning signal is generated, i.e., in a case where there is a printer capable of processing the uncontrolled image signals inputted from the external device 106 on the network 311, the printer selector is controlled to select the printer at step S32. Then, the control processing unit 303 is controlled to output the image signals, stored in the page memory 303a, whose levels are uncontrolled.

Further, in a case where a warning signal is generated and the user instructs to print the image, the printer selector 321 is controlled to select the most suitable printer at step S34, and the control processing unit 303 is controlled to control the levels of the image signals stored in the page memory 303a to be within the capability of the most suitable printer at step S35.

According to the sixth embodiment as described above, the following advantages can be achieved in addition to the advantages obtained in the fifth embodiment by using a plurality of color printers or color copying machines as output devices via a network. First, a printer having capability of outputting the image signals, inputted from an external device, whose levels are uncontrolled (printer (1)) and a printer with which the minimum control of the image signal levels is necessary to output the image signals (printer (2)) is found from the plurality of color printers. Second, if there is the printer (1), the uncontrolled image signals are outputted to it, whereas if there is no printer (1) but there is the printer (2), the image signals whose levels are controlled in accordance with the capability of the printer (2) are outputted. According to the sixth embodiment, therefore, image signals inputted from an external device are outputted to a color printer or a color copying machine without any or with the minimal-necessary signal level control, which results in the most effective use of a plurality of color printers or color copying machines connected to a network. Thereby, it is possible to obtain a color image reproduced with colors which are closer to what the user desired.

Figure 21:
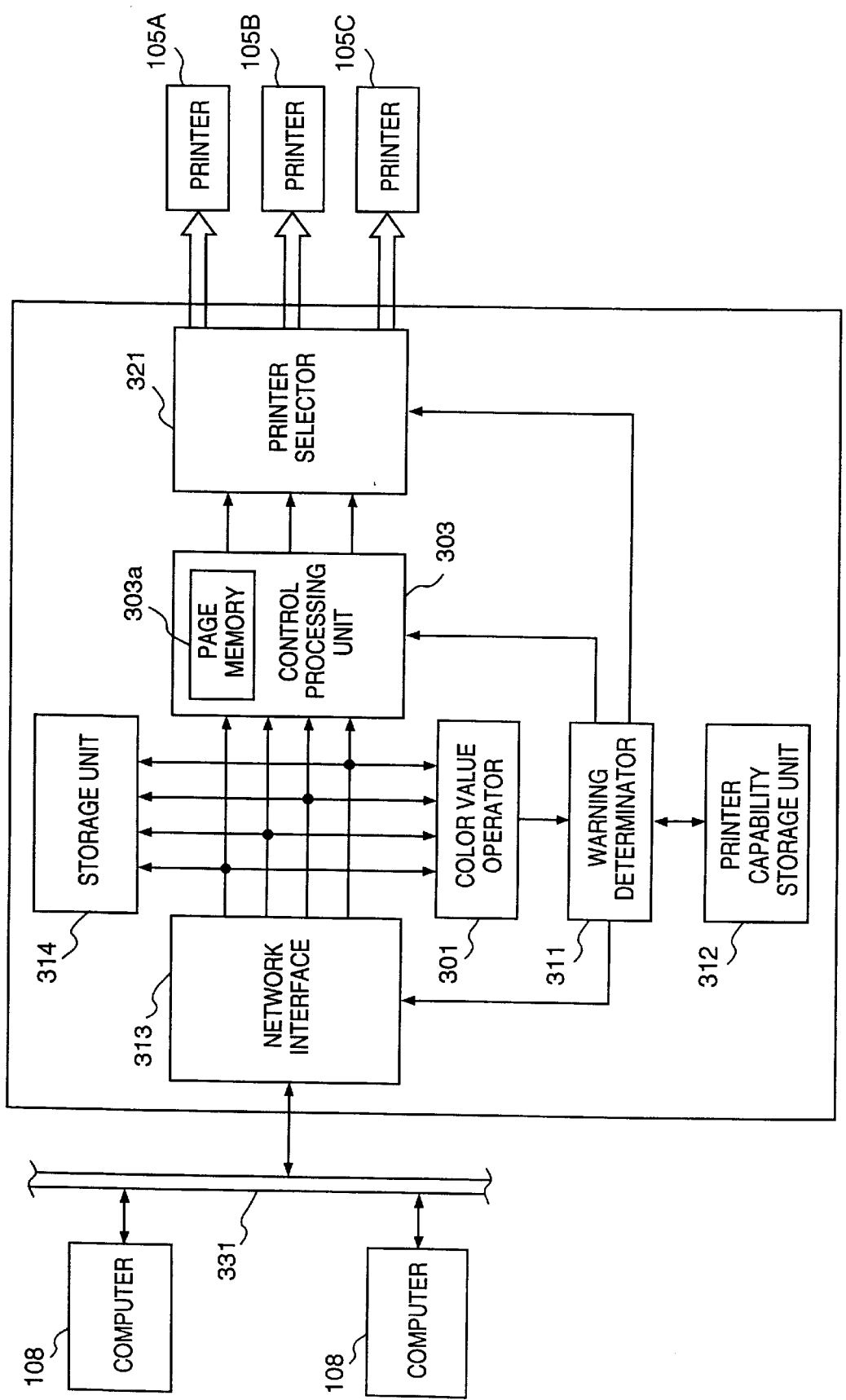
FIG. 21 is a block diagram illustrating an example when a plurality of printers which are connected to the image processing apparatus of the sixth embodiment.

Note, the image processing apparatus of the sixth embodiment is not only connected to the external device 106 is also applied to a printer server to which a plurality of printers are connected by configuring a system as shown in FIG. 21.

More specifically, referring to FIG. 21, image signals transmitted from a plurality of computers 108 through the network 331 are temporarily spooled in the storage unit 314 via the network interface 313. Then, these image signals are normally transmitted from the storage unit 314 to one of the printers 105A to 105C in the order that they are inputted, thereby an image is printed. The image signals read out from the storage unit 314 are to be processed with the aforesaid configuration and operation before transmitting the printer. Note, a warning signal generated by the warning determinator 311 is sent to the computer 108, which is an originator of the image signals, through the network 331 via the network interface, and an instruction from a user in response to the warning signal is transmitted to the network interface 313 through the network 331 in turn, then reaches the warning determinator 311.

Note, the configuration shown in FIG. 21 has the storage unit 314, thus it is possible to omit the page memory 303a by configuring the apparatus so that the image signals can be read out from the storage unit 314 again after completion the determination processes (steps S21 to S24) performed by the warning determinator 311.

<Modification>

In the above embodiments, the methods using image signals of four colors, namely C, M, Y and K signals, as input image signals are explained, however, the above embodiments can be applied to image signals of three colors, C, M and Y.

The signal control unit 201 which is described above can be provided in a signal path which is different from the signal path of the image signals in the normal copying operation by the color copying machine 100. Therefore, it can be provided in an image forming apparatus (color copying machine 100) or in the external device 106, or the signal control unit 201 can be prepared by itself and provided between the external device 106 and the color copying machine 100.

In a case of providing the external device 106 with the signal control unit 201, the advantages of the present invention can also be achieved by providing a storage medium storing program codes of a software for performing the aforesaid processes for the external device 106, and reading the program codes with the external device 106 from the storage medium, then executing the program. In this case, the program codes read from the storage medium realize the functions according to the embodiments, and the storage medium storing the program codes constitutes the invention. Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments being realized by executing the program codes which are read by a computer which is the external device 106, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowchart described in the embodiments. Briefly, the storage medium stores each module shown as an example of a memory map in FIG. 12. More specifically, program codes which correspond to "summation operation" module and "signal level control" module, at least, are to be stored in the storage medium. Further, program codes which correspond to "conversion table selection" and "conversion table set" modules, "sum/processing capability comparison" and "UCR value operation"

modules, or "color correction parameter generation" and "color correction" modules are to be stored in the storage medium. Besides, program codes which correspond to "summation" module, "warning signal generation" module, and "signal level control" module or program codes which corresponds to "summation" module, "warning signal generation" module, "destination device selection" module, and "signal level control" module, at least, are to be stored in the storage medium.

The present invention can be applied to a system constituted by a plurality of devices (e.g., host computer, interface, reader, printer) or to an apparatus comprising a single device (e.g., copying machine, facsimile).

Furthermore, the printer is not limited to a frame sequential printer, and can be a printer which has a plurality of electrostatic drums each of which corresponds to each recording color and forms an image by controlling these drums. Note, in this type of printer, it is necessary to form latent images in the plurality of electrostatic drums after compensating for the shift of positions of image formation in the electrostatic drums by synchronizing each of the C, M, Y and K signals to the image formation in each electrostatic drum. Therefore, the printer of this type has an image memory in the printer, and has a configuration which temporarily stores C, M, Y and K density signals in the image memory, reads out the C, M, Y and K signals separately from the image memory in synchronization with the timing of the image formation in each electrostatic drum.

The advantages of the present invention can be achieved by arbitrarily combining the above embodiments, thus the combination of the above embodiments are also included in the present invention.

According to the above embodiments, warning a operation is performed in such a manner that it is convenient to prevent transfer error and fixing error caused because the sum of input image signals exceeds the capability of a printer. Therefore, it is possible to prevent dispersion of toners, thereby obtaining an output image of good quality.

The present invention is not limited to the above embodiments and various changes and modifications can be made within the spirit and scope of the present invention. Therefore, to apprise the public of the scope of the present invention the following claims are made.

What is claimed is:

1. An image processing apparatus for controlling values of input image signals depending upon a destination device to which the image signals are outputted, said apparatus comprising:
   generation means for generating a sum of input image signal values of each of color components which include a black component; and
   control means for controlling the values of the input image signals so that the generated sum is not more than the total amount of recording materials, which has been set in accordance with a capability of the destination device, for recording an image used by the destination device.

2. The image processing apparatus according to claim 1, wherein said generation means generates the sum of the input image signal values of each of the color components by pixel.

3. The image processing apparatus according to claim 2, wherein said control means compares the generated sum and the capability of the destination device, and reduces the input image signal values in accordance with the comparison result.

4. The image processing apparatus according to claim 3, wherein the capability of the destination device is represented as the sum of the image signal values of each of color components within which the destination device can output copy of a predetermined quality.

5. The image processing apparatus according to claim 3, wherein the destination device is an electrophotographic type printer which forms a visual image based on the input image signals on a recording medium.

6. The image processing apparatus according to claim 2, further comprising detecting means for detecting the maximum values for each color component of the input image signals, wherein said generation means sums up all the detected maximum values of each color component to obtain a sum value, and said control means compares the generated sum and the capability of the destination device and reduces the input image signal values in accordance with a comparison result.

7. The image processing apparatus according to claim 6, wherein the capability of the destination device is represented as the sum of the image signal values of each of color components within which the destination device can output copy of a predetermined quality.

8. The image processing apparatus according to claim 6, wherein the destination device is an electrophotographic type printer which forms a visual image, based on the input image signals, on a recording medium.

9. The apparatus according to claim 1, further comprising UCR processing means, controlled by said control means, for performing an under color removal process on the input image signals.

10. The apparatus according to claim 1, wherein the destination device is a printer which forms an image on a recording medium using the recording materials.

11. The apparatus according to claim 1, further comprising input means for inputting the input image signals from an external apparatus.

12. An image processing apparatus for controlling values of input image signals depending upon a destination device to which the image signals are outputted, said apparatus comprising:
   first generation means for generating a sum of input image signal values of each of color components which include a black color component;
   comparison means for comparing the generated sum and a capability of the destination device;
   second generation means for generating an under color removal value from the image signal values of each of the color components in accordance with the comparison result obtained by said comparison means; and
   control means for controlling the input image signal values on the basis of the generated under color removal value so that the generated sum is not more than the total amount of recording materials, which has been set in accordance with the capability of the destination device, for recording an image used by the destination device.

13. The image processing apparatus according to claim 12, wherein said second generation means generates the under color removal value on the basis of the input signal values of the black component and the minimum input signal value out of the input signal values of other color components.

14. The image processing apparatus according to claim 12, wherein said control means reduces the controlled image signal values on the basis of the controlled image signal values and the capability of the destination device in a case where the controlled image signal values are not within the capability of the destination device.

15. The image processing apparatus according to claim 12, wherein the capability of the destination device is represented as the sum of the image signal values of each of color components within which the destination device can output copy of a predetermined quality.

16. The image processing apparatus according to claim 12, wherein the destination device is an electrophotographic type printer which forms a visual image, based on the input image signals, on a recording medium.

17. An image processing method of controlling values of input image signals depending upon a destination device to which the image signals are outputted, said method comprising the steps of:

generating a sum of input image signal values of each of color components which include a black component; and controlling the values of the input image signals so that the generated sum is not more than the total amount of recording materials, which has been set in accordance with a capability of the destination device, for recording an image used by the destination device.

18. The image processing method according to claim 17, wherein in the generation step, the sum of the input image signal values of each of the color components is generated by pixel.

19. The image processing method according to claim 18, further comprising a step of detecting the maximum values for each color component of the input image signals, wherein in the generation step, all the detected maximum values of each color component are summed to obtain a total value, and in the control step, the generated sum is compared to the capability of the destination device and the input image signal values are reduced in accordance with a comparison result.

20. An image processing method of controlling values of input image signals depending upon a destination device to which the image signals are outputted, said method comprising the steps of:

generating a sum of input image signal values of each of color components which include a black component; and comparing the generated sum and a capability of the destination device;

generating an under color removal value from the image signal values of each of the color components in accordance with a comparison result obtained in the comparison step; and controlling the input image signal values on the basis of the generated under color removal value so that the generated sum is not more than the total amount of recording materials, which has been set in accordance with the capability of the destination device, for recording an image used by the destination device.

21. An image processing apparatus for outputting color image data depend on a destination device, said apparatus comprising:

first input means for inputting color image data represented by a first color system;

first conversion means for converting the color image data inputted by said first input means to color image data dependent on a second color system which corresponds to the destination device, where said first conversion means limits a sum of the first converted color image data based on a capability of the destination device;

second input means for inputting color image data represented by the second color system from an external device which is different from the destination device; and second conversion means for converting the color image data inputted by said second input means to color image data represented by the second color system so that the sum of the second converted color image data is kept within a value corresponding to the capability.

22. The apparatus according to claim 21, wherein the destination device is an electrophotographic type printer, which forms a visual image, based on inputted color image data on a recording medium.

23. The apparatus according to claim 21, wherein said first input means has a scanner to generate color image data to be inputted by scanning an original.

24. The apparatus according to claim 21, wherein said first conversion means performs masking and UCR processing.

* * * * *

UNITED STATES PATENT AND TRADEMARK OFFICE
CERTIFICATE OF CORRECTION

PATENT NO. : 6,023,344

DATED : February 8, 2000

INVENTOR(S) : TAKASHI YABE

It is certified that error appears in the above-identified patent and that said Letters Patent is hereby corrected as shown below:

COLUMN 4:

Line 59, "$Sum_{In}/255$" should read --$Sum\_In/255$--.

COLUMN 6:

Line 22, "gene rates" should read --generates--;
Line 33, "Lim.According" should read --Lim.¶According--;
Line 47, "referred" should read --referred to--; and
Line 60, "an" should read --a--.

COLUMN 7:

Line 38, "characteristics" should read --characteristic--; and
Line 41, "characteristics" should read --characteristic--.

COLUMN 8:

Line 5, "referred" should read --referred to--; and
Line 25, "transfer" should read --transferred--.

COLUMN 9:

Line 56, "referred" should read --referred to--.

COLUMN 10:

Line 5, "signals" should read --signal--; and
Line 39, "a" should read --an--.

UNITED STATES PATENT AND TRADEMARK OFFICE
CERTIFICATE OF CORRECTION

PATENT NO. : 6,023,344

DATED : February 8, 2000

INVENTOR(S) : TAKASHI YABE

It is certified that error appears in the above-identified patent and that said Letters Patent is hereby corrected as shown below:

COLUMN 11:

Line 23, "proceeds" should read --proceed--;
    Line 44, "received" should read --receives--;
    Line 45, "is to be controlled its level" should read
            --is to have its level controlled--;
    Line 52, "referred" should read --referred to--; and
    Line 53, "explanation" should read --explanations--.

COLUMN 12:

Line 30, "These" should read --This--.

COLUMN 13:

Line 53, "106" should read --106 but--.

COLUMN 15:

Line 5, "corresponds" should read --correspond--; and
    Line 31, "warning a" should read --a warning--.

UNITED STATES PATENT AND TRADEMARK OFFICE
CERTIFICATE OF CORRECTION

PATENT NO. : 6,023,344

DATED : February 8, 2000

INVENTOR(S) : TAKASHI YABE

It is certified that error appears in the above-identified patent and that said Letters Patent is hereby corrected as shown below:

COLUMN 18:

Line 13, "depend" should read --depending--.

Signed and Sealed this

Seventeenth Day of April, 2001

Attest:

NICHOLAS P. GODICI

Attesting Officer

Acting Director of the United States Patent and Trademark Office